United States Patent
Eilertsen et al.

(10) Patent No.: US 11,774,060 B2
(45) Date of Patent: Oct. 3, 2023

(54) STRUCTURED AND DIFFUSE LIGHT GENERATION

(71) Applicant: NIL Technology ApS, Kongens Lyngby (DK)

(72) Inventors: James Eilertsen, Skodsborg (DK); Martin Balimann, Zurich (CH); Moritz Schmidlin, Zurich (CH)

(73) Assignee: NIL Technology ApS, Kongens Lyngby (DK)

( * ) Notice: Subject to any disclaimer, the term of this patent is extended or adjusted under 35 U.S.C. 154(b) by 0 days.

(21) Appl. No.: 18/022,870

(22) PCT Filed: Aug. 20, 2021

(86) PCT No.: PCT/EP2021/073117
§ 371 (c)(1),
(2) Date: Feb. 23, 2023

(87) PCT Pub. No.: WO2022/043202
PCT Pub. Date: Mar. 3, 2022

(65) Prior Publication Data
US 2023/0220974 A1 Jul. 13, 2023

Related U.S. Application Data

(60) Provisional application No. 63/070,097, filed on Aug. 25, 2020.

(51) Int. Cl.
*F21V 5/00* (2018.01)
*F21Y 105/12* (2016.01)
*F21Y 115/30* (2016.01)

(52) U.S. Cl.
CPC ............. *F21V 5/004* (2013.01); *F21V 5/007* (2013.01); *F21Y 2105/12* (2016.08); *F21Y 2115/30* (2016.08)

(58) Field of Classification Search
CPC ........ F21V 5/004; F21V 5/007; F21Y 2105/12; F21Y 2115/30
See application file for complete search history.

(56) References Cited

U.S. PATENT DOCUMENTS

| | | | |
|---|---|---|---|
| 9,273,846 B1 | 3/2016 | Rossi et al. | |
| 2006/0044803 A1* | 3/2006 | Edwards | F21K 9/00 257/E25.02 |

(Continued)

FOREIGN PATENT DOCUMENTS

| | | |
|---|---|---|
| EP | 3250882 | 11/2019 |
| JP | 5113820 | 1/2013 |

(Continued)

OTHER PUBLICATIONS

International Preliminary Report on Patentability in International Appln. No. PCT/EP2021/073117, dated Mar. 9, 2023, 7 pages.

(Continued)

*Primary Examiner* — Evan P Dzierzynski
(74) *Attorney, Agent, or Firm* — Fish & Richardson P.C.

(57) ABSTRACT

An optical device includes an array of light-emitting elements, including a first subset of light-emitting elements and a second subset of light-emitting elements. The first subset of light-emitting elements is configured to emit light having wavelength $L_1$. The device includes a high refractive index material selectively disposed on the second subset of light-emitting elements and an array of optical elements positioned so as to be illuminated by the first subset of light-emitting elements and by the second subset of light-emitting elements. The optical elements are regularly arranged in a common plane at a pitch P, the common plane is located a distance D from the array of light-emitting elements, and $P^2 \approx 2L_1 D/N$, N being an integer greater than or equal to 1.

21 Claims, 10 Drawing Sheets

(56) References Cited

U.S. PATENT DOCUMENTS

| | | | |
|---|---|---|---|
| 2010/0072496 A1* | 3/2010 | Kobayakawa | H01L 25/0753 |
| | | | 257/91 |
| 2013/0114242 A1 | 5/2013 | Pickard et al. | |
| 2013/0170203 A1* | 7/2013 | Cheng | F21V 5/007 |
| | | | 362/235 |
| 2013/0328077 A1* | 12/2013 | Chen | H01L 33/405 |
| | | | 257/E33.072 |
| 2015/0036114 A1* | 2/2015 | Schadt | F21V 5/007 |
| | | | 362/241 |
| 2017/0256687 A1 | 9/2017 | Yoo et al. | |
| 2018/0267214 A1 | 9/2018 | Rossi et al. | |
| 2019/0049097 A1 | 2/2019 | Rossi et al. | |

FOREIGN PATENT DOCUMENTS

| | | |
|---|---|---|
| JP | 2014049504 | 3/2014 |
| KR | 20110044737 | 4/2011 |
| WO | WO 2017131585 | 8/2017 |
| WO | WO 2020023160 | 1/2020 |

OTHER PUBLICATIONS

International Search Report and Written Opinion in International Appln. No. PCT/EP2021/073117, dated Dec. 3, 2021, 10 pages.

* cited by examiner

STRUCTURED AND DIFFUSE LIGHT GENERATION

CROSS-REFERENCE TO RELATED APPLICATIONS

This application is a National Stage Application under 35 U.S.C. § 371 and claims the benefit of International Application No. PCT/EP2021/073117, filed Aug. 20, 2021, which claims priority to U.S. Application No. 63/070,097, filed Aug. 25, 2020, the disclosure of which is incorporated herein by reference.

BACKGROUND

Structured light can be used in a variety of applications, including three-dimensional (3D) mapping and distance sensing. For example, structured light may be projected onto an object as an array of dots, and deformations of the array may be analyzed to determine the shape of the object. Particular arrangements of arrays of optical elements and arrays of light-emitting elements can be used to generate structured light.

FIELD OF THE DISCLOSURE

The present disclosure relates to optical devices for generating structured light.

SUMMARY

In one aspect, the present disclosure describes an optical device that includes an array of light-emitting elements, including a first subset of light-emitting elements and a second subset of light-emitting elements, in which the first subset of light-emitting elements is configured to emit light having wavelength $L_1$; a high refractive index material selectively disposed on the second subset of light-emitting elements; and an array of optical elements positioned so as to be illuminated by the first subset of light-emitting elements and by the second subset of light-emitting elements, in which the optical elements are regularly arranged in a common plane at a pitch P, in which the common plane is located a distance D from the array of light-emitting elements, and in which $P^2 \approx 2L_1 D/N$, N being an integer greater than or equal to 1.

Implementations of the optical device may include one or more of the following. The second subset of light-emitting elements is configured to emit light having wavelength $L_2$, in which the high refractive index material is configured to impose an effective optical distance $D_2$ between the second subset of light-emitting elements and the common plane, and in which $P_2 \neq 2L_2 D_2/N$, N being an integer greater than or equal to 1. $L_1$ is not equal to $L_2$. The first subset of light-emitting elements and the second subset of light-emitting elements are arranged in a common emitter plane. The first subset of light-emitting elements and the second subset of light-emitting elements are arranged in respective non-overlapping areas. The first subset of light-emitting elements and the second subset of light-emitting elements are interlaced with one another. The first subset of light-emitting elements is arranged in a first pattern, and the second subset of light-emitting elements is arranged in a second pattern different from the first pattern.

Implementations of the optical device may also include one or more of the following. The array of optical elements causes light emitted by each light-emitting element to be transformed into a far field light pattern of regularly spaced light spots, and the regularly spaced light spots generated by different light-emitting elements of the second subset of light-emitting elements overlap with one another. At a given far-field distance from the array of optical elements, each light spot generated by a light-emitting element of the second subset of light-emitting elements is bigger than each light spot generated by a light-emitting element of the first subset of light-emitting elements. The optical elements include lenses. The array of light-emitting elements includes vertical cavity surface emitting lasers. The high refractive index material includes a curable epoxy.

Implementations of the optical device may also include one or more of the following. The high refractive index material has a refractive index greater than about 1. The high refractive index material has a refractive index between about 1.1 and about 2.0. The high refractive index material has a refractive index between about 1.4 and about 1.9. The high refractive index material has a thickness between about 10 μm and about 300 μm. Light generated by the first subset of light-emitting elements and passing through the array of optical elements has a regular far field pattern, and light generated by the second subset of light-emitting elements and passing through the array of optical elements is diffuse in the far field. The second subset of light-emitting elements are relatively positioned, with respect to a grid having unit cell spacing P, such that at least a portion of the second subset of light-emitting elements are at different positions with respect to the unit cells in which the light-emitting elements are located.

The disclosure also describes systems. For example, the disclosure describes a system including an optical device as previously described, and control circuitry configured to cause the first subset of light-emitting elements or the second subset of light-emitting elements to emit light independently of one another. In some implementations, the system includes a light-sensing element configured to detect structured light emitted by the optical device.

Embodiments of the subject matter described in this specification can be implemented to realize one or more of the following advantages. In some implementations, for example, module cost and/or size may be reduced. In some implementations, a single optical element array may be illuminated by multiple subsets of light-emitting elements. In some implementations, light-emitting elements may be positioned to provide diffuse far-field illumination. In some implementations, light diffusivity may be enhanced by the inclusion of a high refractive index layer and/or by selection of a wavelength emitted by light-emitting elements.

The details of one or more implementations are set forth in the accompanying drawings and the description below. Other features and advantages will be apparent from the description and drawings, and from the claims.

DETAILED DESCRIPTION

The present disclosure describes optical modules for generating structured and diffuse light. For certain implementations, this disclosure describes optical modules having a first subset of light-emitting elements, a second subset of light-emitting elements, and a high refractive index material selectively disposed on the second subset of light-emitting elements but not on the first subset of light-emitting elements.

Light having a particular pattern, sometimes called "structured light" or "patterned light," can be projected onto surfaces to allow for specialized sensing operations. For example, based on detection of the structured light projected onto a surface, a distance between the source of the structured light and the surface may be determined. Structured light can also be used, for example, for 3D scanning and real-time 3D mapping.

One application of structured light is depth determination. An array of dots is projected onto an object, the projected dots are imaged, and triangulation is performed to calibrate a distance between the projector and the object or to depth-map the object. The array of dots may be produced by a diffractive optical element or by using an array of optical elements satisfying the Lau condition, as described below.

In some applications, it may be desirable to integrate unstructured ("diffuse") light into devices that also can project structured light. For example, in imaging applications, an imaged object may be illuminated with both a dot pattern (structured light) and with diffuse illumination, simultaneously or at different times. The structured light may be detected in order to depth-map the object, and an image of the object taken under diffuse illumination may provide, for example, color information, texture information, and information about fine details of the object. In some implementations, the 3D map of the image may be combined with the image taken under diffuse illumination so as to, for example, integrate the object into a virtual reality or augmented reality environment.

In various applications, structured light and diffuse light may be integrated into mobile devices, wearable devices (e.g., smartwatches), videogame consoles or accessories, vehicles (including autonomous vehicles), and virtual reality systems.

However, the inclusion of two separate modules—a structured light module and a diffuse light module—may increase device size and/or cost. Therefore, according to the embodiments described in this disclosure, a structured light submodule may be integrated together with a diffuse light submodule in order to generate either type of light from one module.

Figure 1:
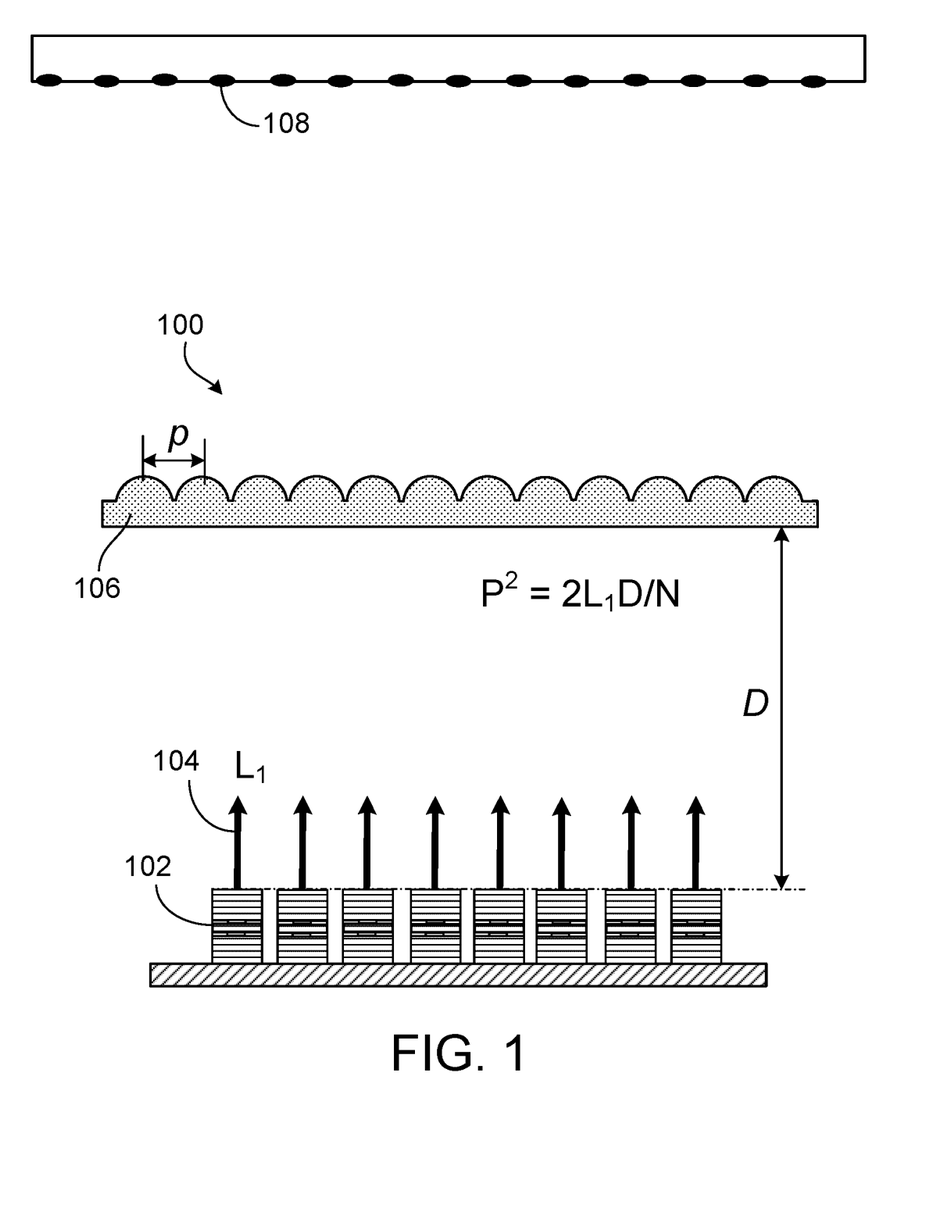
FIG. 1 is a schematic showing an example of an optical module.

Structured light may be generated using a module 100 as shown, for example, in FIG. 1. An array of light-emitting elements 102 emits light 104 having wavelength $L_1$ towards an array of optical elements 106 (e.g., lenses) having pitch P, with a distance D separating the array of light-emitting elements 102 from the array of optical elements 106. In this example, the optical elements 106 are positioned in a common plane. In some implementations, this distance D (and other distances described in this disclosure) may be an effective optical distance.

For certain combinations of P, D, and $L_1$, structured light 108 (e.g., as shown in FIG. 1, an array of dots) is projected into the far-field. In particular, structured light can be produced when P, D, and $L_1$ satisfy or approximately satisfy the Lau condition:

$$P^2 = 2L_1 D/N,$$

where N is an integer greater than or equal to 1.

As the combination of parameters varies away from exactly satisfying the Lau condition, a level of structure in the structured light (e.g., a concentration of light localized in discrete dots) correspondingly decreases.

The light-emitting elements 102 may include, for example, light-emitting diodes and/or lasers. In some embodiments, the light-emitting elements are vertical-cavity surface-emitting lasers (VCSELs).

As described above, it may be desirable for a module to be configured to emit both structured light and diffuse light. "Diffuse light," as used in this disclosure, is a comparative term: diffuse light is less structured than structured light, but may still include some amount of structure. For example, if a module emits structured light resulting in a far-field array of discrete dots on a surface, diffuse light emitted from the same module may produce continuous illumination over the surface, and may (but need not) produce comparative peaks of illumination intensity corresponding to the discrete dots of the structured light. In some implementations, diffuse light may produce substantially uniform illumination over a relatively wide, continuous surface.

Figure 2A:
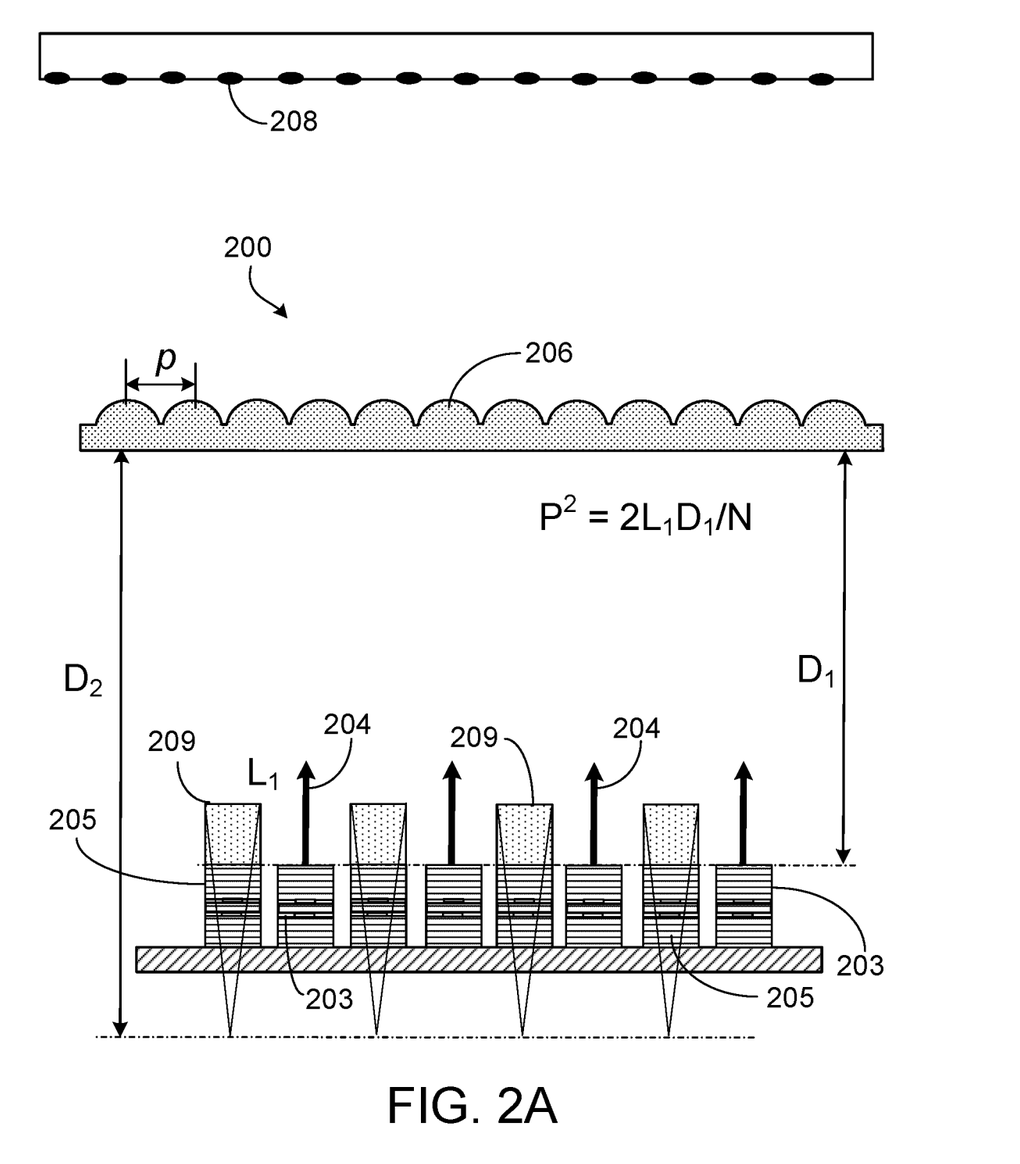
FIGS. 2A-2B are schematics showing an example of an optical module including two subsets of light-emitting elements.
Figure 2B:
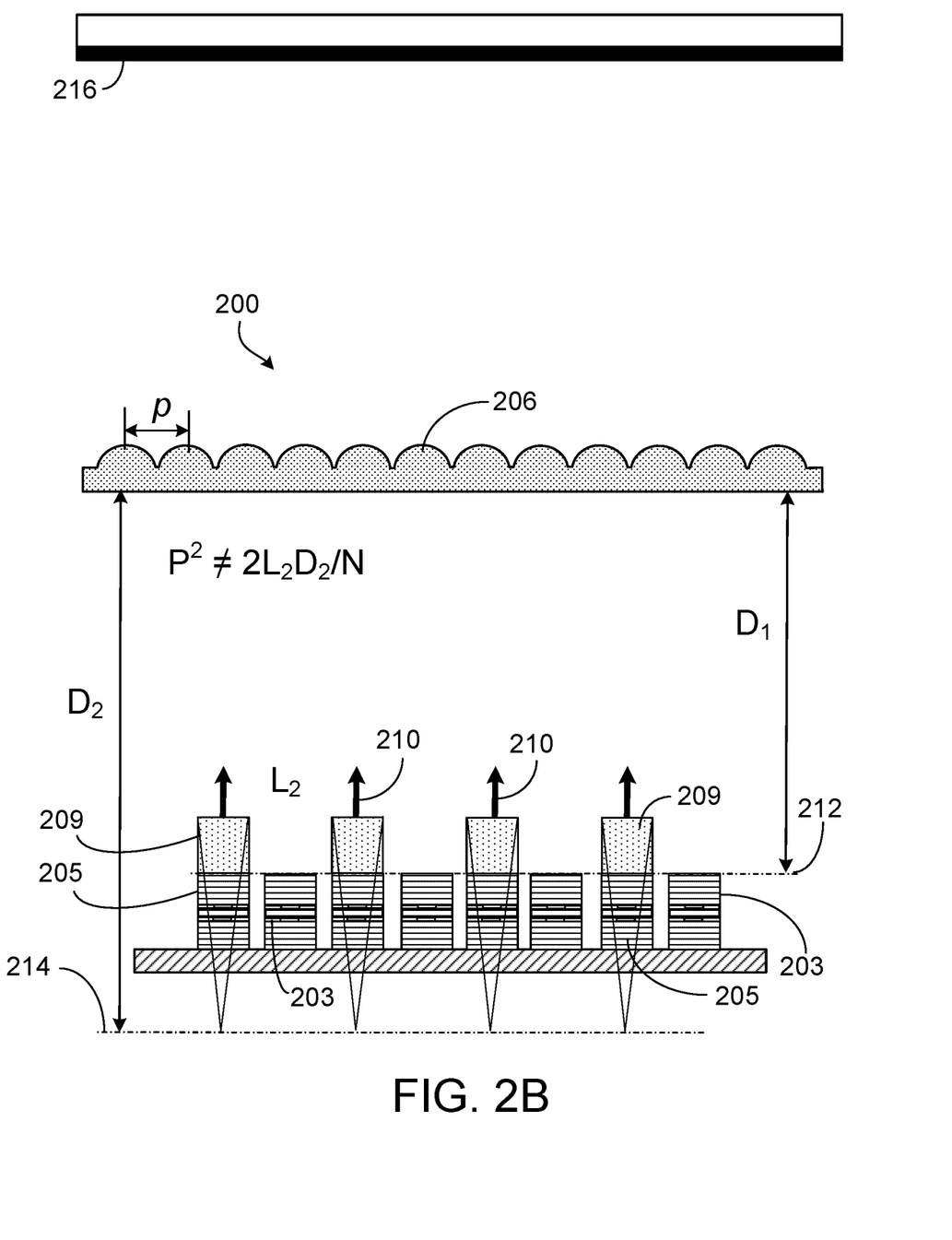

FIGS. 2A-2B show an example of a module 200 operable to emit both structured and diffuse light. The module 200 includes an array of optical elements 206 having pitch P and an array of light-emitting elements, the light-emitting elements being divided into a first subset of light-emitting elements 203 and a second subset of light-emitting elements 205. A layer of high refractive index material 209 is selectively disposed on each light-emitting element of the second subset of light-emitting elements 205.

The high refractive index material 209 may include, for example, an epoxy, e.g., a thermally- and/or UV-curable epoxy. In some implementations, the array of light-emitting elements is selectively masked (e.g., to expose only the light-emitting elements 205 of the second subset), and the epoxy is deposited over the array, e.g., by spin-coating or dip-coating. In some implementations, the epoxy may be selectively deposited onto the light-emitting elements 205 of the second subset, e.g., by ink jetting one or more droplets of epoxy onto each light-emitting element 205 of the second subset. In some implementations, the high refractive index material 209 may be screen-printed onto the light-emitting elements 205 of the second subset.

In some implementations, the high refractive index material 209 may be included in a separate structure that is attached to the array of light-emitting elements. For example, the high refractive index material 209 may be glass, and one or more pieces of the glass may be attached (e.g., glued) to the array of light-emitting elements, such that the light-emitting elements 205 of the second subset are covered by the glass. This may allow for comparatively thicker layers of the high refractive index material 209.

In various implementations, the high refractive index material 209 may have a refractive index of greater than about 1.0, between about 1.1 and about 2.0, between about 1.4 and about 1.9, or between about 1.5 and about 1.8.

In some implementations, the high refractive index material 209 may have a thickness of between about 10 μm and about 300 μm, between about 10 μm and about 400 μm, or between about 50 μm and about 600 μm. A thicker layer of the high refractive index material 209 may provide a greater optical effect than a thinner layer, though other considerations (e.g., the refractive index) also determine the magnitude of the optical effect.

"High refractive index material," as used in this disclosure, refers at least to one or more particular layers of high refractive index material that are disposed on the second subset of light-emitting elements but not on the first subset of light-emitting elements. The first subset of light-emitting elements may include, as part of their device structure, one or more layers of a high refractive index material, but the particular composition and placement of at least one layer of high refractive index material is particular to the second subset of light-emitting elements.

In various implementations, the array of optical elements may include, for example, an array of lenses, e.g., microlenses (e.g., discrete microlenses each having a convex surface), an array of diffractive optical elements (e.g., diffractive lenses or another diffractive element that interacts with incident light), and/or an array of metalenses. The array of optical elements may be formed, in some implementations, by performing a replication process, e.g., imprinting or embossing. The array of optical elements may include an epoxy material. In some implementations, the array of optical elements may be formed by nanofabrication techniques, e.g., nanoimprint lithography combined with lift-off.

As shown in FIG. 2A, the first subset of light-emitting elements 203 may operate as described for module 100 in FIG. 1. Light 204 having wavelength $L_1$ is emitted, and, because the Lau condition is satisfied, structured light 208 is projected into the far-field.

A different process occurs when the second subset of light-emitting elements 205 emits light 210 having wavelength $L_2$, as shown in FIG. 2B. The presence of the high refractive index material 209 effectively changes the optical distance between the second subset of light-emitting elements 205 and the array of optical elements 206. In particular, the path length for light traveling through the high refractive index material 209 is effectively multiplied by the refractive index (which is greater than one). Thus, the presence of the high refractive index material 209 effectively changes the optical distance between the second subset of light-emitting elements 205 and the array of optical elements 206, making the effective distance not $D_1$, but $D_2$. These respective distances can be interpreted in terms of different focus planes 212 and 214 for the first subset of light-emitting elements and the second subset of light-emitting elements, respectively.

The second subset of light-emitting elements 205 and the array of optical elements 206 are configured such that the Lau condition is not satisfied for the light 210 emitted by the second subset of light-emitting elements, e.g., such that $P^2 \ne 2L_2D_2/N$, or such that a deviation from the Lau condition for the light 210 is greater than a deviation from the Lau condition for the light 204. Therefore, the light 210 will, in the far-field, provide diffuse illumination 216. In some implementations, deviation from the Lau condition for the light 210 is greater than about 50 μm of deviation in effective optical distance D, greater than about 75 μm of deviation in effective optical distance D, greater than about 30 μm of deviation in effective optical distance D, or greater than about 10 μm of deviation in effective optical distance D.

Satisfaction of the Lau condition for the light 204 (e.g., $P^2=2L_1D_1/N$) may be only approximate or comparative. For example, operational variation or intentional configuration may mean that, in some implementations, there is some non-zero deviation from the Lau condition for the light 204. "$P^2=2L_1D_1/N$" and analogous expressions, as used in this disclosure, include at least approximate satisfaction of the Lau condition (e.g., $P^2 \approx 2L_1D_1/N$) and/or comparative satisfaction compared to the light 210 emitted by the second subset of light-emitting elements. In some implementations, deviation from the Lau condition for the light 204 is less than about 50 μm of deviation in effective optical distance D, less than about 75 μm of deviation in effective optical distance D, less than about 30 μm of deviation in effective optical distance D, or less than about 10 μm of deviation in effective optical distance D.

The example of FIGS. 2A-2B shows the first subset of light-emitting elements 203 and the second subset of light-emitting elements 205 in a common plane, such that a physical (non-effective) distance between each light-emitting element 203, 205 and the array of optical elements 206 is the same. However, in some implementations, light-emitting elements may be positioned at different distances from the array of optical elements. For example, the first subset of light-emitting elements 203 may be in a first common plane, and the second subset of light-emitting elements 205 may be in a second common plane different from the first common plane. In some implementations, light-emitting elements of both subsets may be distributed across two or more planes. In some implementations, a common plane of the light-emitting elements may be parallel to a plane in which the array of optical elements is positioned.

In some implementations, the light-emitting elements 205 of the second subset may be different from the light-emitting elements 203 of the first subset. For example, the wavelength $L_2$ of the light 210 emitted by the second subset of light-emitting elements 205 may be different from the wavelength $L_1$ of the light 204 emitted by the first subset of light-emitting elements. This may be accomplished by using different device structures for the respective types of light-emitting element 203, 205. For example, in some implementations, either the first subset or the second subset, or both, may include features (e.g., nanostructures) that upconvert light emitted by those light-emitting elements. In some implementations, the first subset and the second subset may operate at different injection currents from one another, which may cause a difference in emission wavelength. For example, when the light-emitting elements include lasers, a higher injection current may result in a red shift of the lasing wavelength and therefore a red shift of the emitted light.

Making $L_2 \ne L_1$ may have the effect of increasing the deviation from the Lau condition for the light 210 emitted by the second subset of light-emitting elements, and thereby increasing the far-field diffuseness of that light. For example, if the structured light resulting from the light 210 is an array of discrete dots, then the addition of the high refractive index material 209, by itself, may cause, in some implementations, each dot resulting from the light 210 to be diffused, in such a way that the dot pattern is still visible within the field of diffuse illumination. Altering the wavelength of the emitted light $L_2$ such that $L_2 \neq L_1$ may further increase the diffuseness of the light, such that the dot pattern is less visible or invisible. In some implementations, $L_1$ and $L_2$ may be equal.

Relative differences of $L_2$ and $D_2$ compared to $L_1$ and $D_1$ may be configured to increase the deviation from the Lau condition for the light 210. That is, it is possible that certain choices of adjustments to $L_1$ and $D_1$ can maintain adherence to the Lau condition by maintaining the $L_1 D_1$ product constant even as the individual parameters change; however, second subsets of light-emitting elements according to this disclosure may be configured such that the Lau condition is not satisfied for light emitted by those light-emitting elements.

In various implementations, light emitted by the light-emitting elements may include infrared light, visible light, ultraviolet light, or a combination thereof.

In various implementations, N (in the Lau condition, as given above) may be between 1 and 10 inclusive, between 1 and 8 inclusive, between 1 and 5 inclusive, or between 1 and 4 inclusive.

In various implementations, the pitch P of the array of optical elements may be between about 10 microns and about 200 microns, between about 25 microns and about 100 microns, or between about 40 microns and about 60 microns.

In some instances, optical modules including two subsets of light-emitting elements illuminating an array of optical elements, as shown, for example, in FIGS. 2A-2B, may be smaller than, and/or less expensive to manufacture than, modules in which separate optical elements or components (e.g., separate arrays of lenses or diffractive optical elements) are illuminated by separate sets of light-emitting elements. In addition, the inclusion of one or more layers of high refractive index material on a subset of light-emitting elements may increase a diffusivity of light generated by those elements, in comparison to modules that do not include a comparable layer of high refractive index material.

Figure 3A:
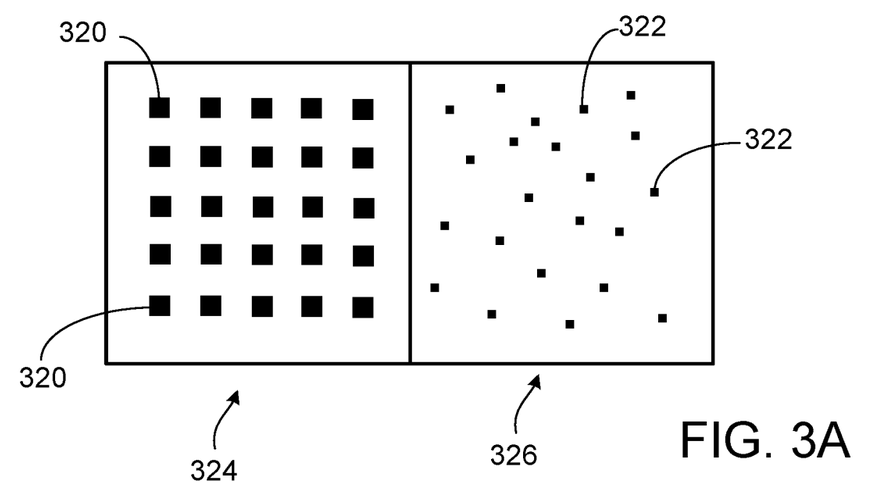
FIGS. 3A-3B are schematics showing examples of optical modules including two subsets of light-emitting elements.

Two subsets of light-emitting elements, as described above, may be implemented in a variety of ways. FIG. 3A shows an example layout in which a first subset of light-emitting elements 320, which do not include a layer of high refractive index material between the light-emitting element 320 and an array of optical elements (not shown), is adjacent to a second subset of light-emitting elements 322, which do include the layer of high refractive index material. The light-emitting elements 320 and 322 are divided exclusively into two non-overlapping sections 324, 326.

Figure 3B:
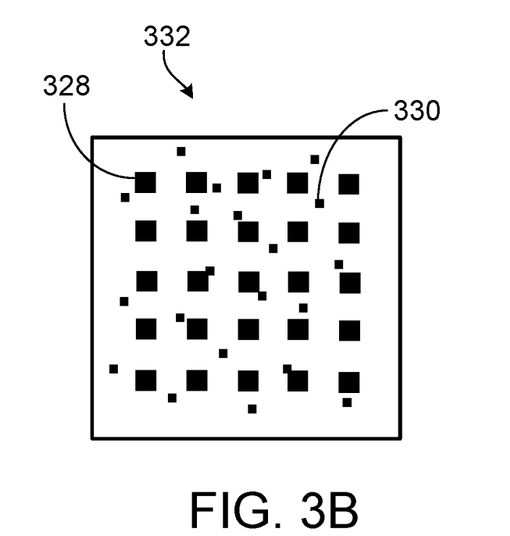

FIG. 3B shows an example layout in which a first subset of light-emitting elements 328, which do not include a layer of high refractive index material, and a second subset of light-emitting elements 330, which do include the layer of high refractive index material, are interlaced in a single section 332.

The sections 324, 326, 332 shown in FIGS. 3A-3B may represent, for example, portions of a substrate (e.g., a semiconductor or dielectric substrate) on which or in which the light-emitting elements are disposed. A total section size for an interlaced arrangement as in FIG. 3B may have, but need not have, a total section size corresponding to the combined sizes of separate sections in a two-section arrangement as in FIG. 3A. In some implementations, a distance between nearest-neighbor light-emitting elements may be comparatively reduced, such that the total section size for an interlaced arrangement is less than the combined sizes of separate sections in the two-section arrangement.

Light-emitting elements may be arranged in a combination of interlaced and separate arrangements. For example, a first portion of a substrate may include light-emitting elements of only the first subset, a second portion of a substrate may include light-emitting elements of only the second subset, and a third portion of the substrate (e.g., a portion between the first portion and the second portion) may include light-emitting elements of both subsets interlaced with one another.

FIGS. 3A and 3B show examples in which the first subset of light-emitting elements 320 is arranged in a regular grid pattern, while the second subset of light-emitting elements 322 is arranged in an irregular pattern. In various implementations the second subset of light-emitting elements 322 may be arranged in a substantially random pattern without repeating structure, or may include multiple sub-subsets that are shifted and/or rotated with respect to one another. In some implementations, the second subset of light-emitting elements 322 may be arranged in a regular pattern. In some implementations, sub-subsets of the second subset of light-emitting elements 322 may be each arranged in a regular pattern.

Figure 4A:
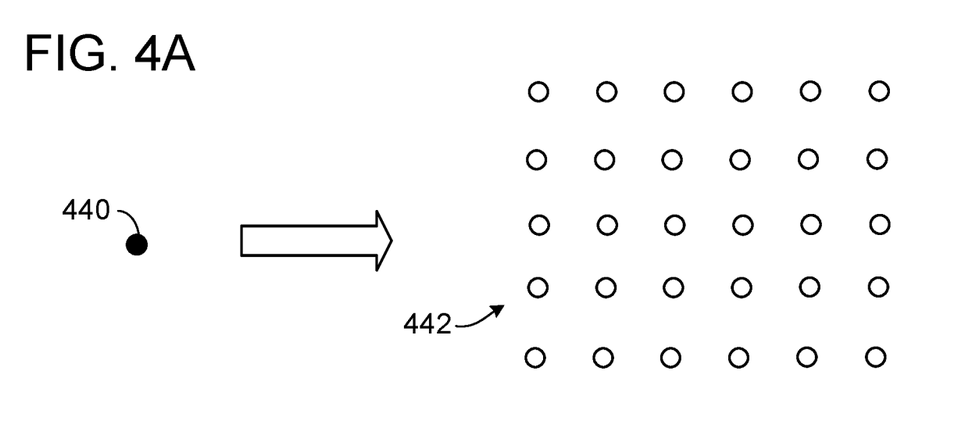
FIGS. 4A-4C are schematics showing examples of far-field light patterns generated by combinations of light-emitting elements.
Figure 4B:
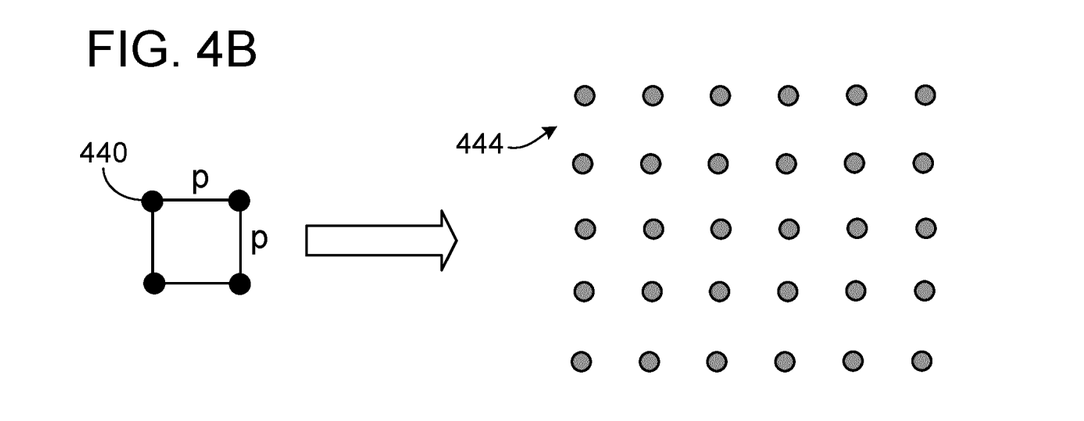
Figure 4C:
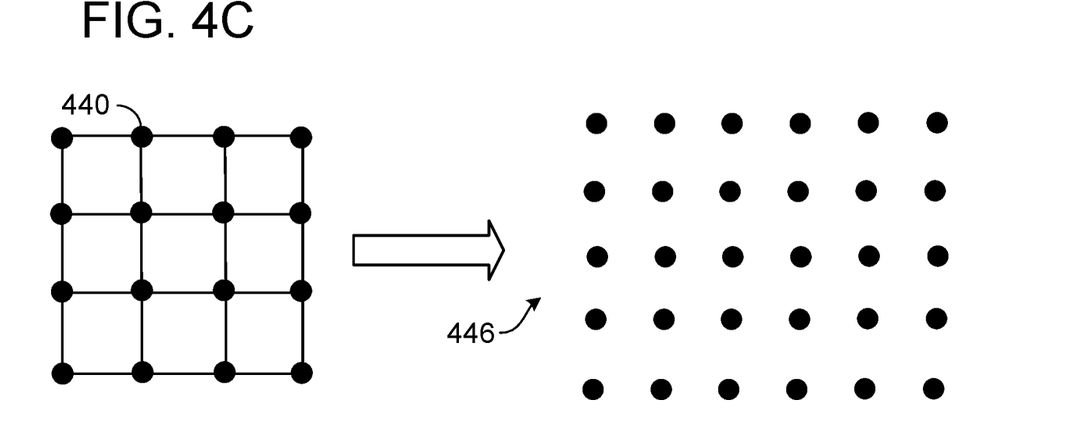

These and other arrangements of the second subset of light-emitting elements are based on the particular light patterns generated by light-emitting modules conforming to the Lau condition. As shown in FIG. 4A, a single light-emitting element 440 (e.g., a light-emitting element in the first subset) illuminating an optical element array with pitch P (not shown) and satisfying the Lau condition will generate a periodic dot pattern 442. The addition of further light emitting-elements, spaced from one another at a matching pitch P, will cause the far-field dots to superimpose on one another, generating a higher-intensity dot pattern 444 with the same periodicity, as shown in FIG. 4B. As shown in FIG. 4C, additional light-emitting elements further intensify the far-field pattern 446.

Figure 5A:
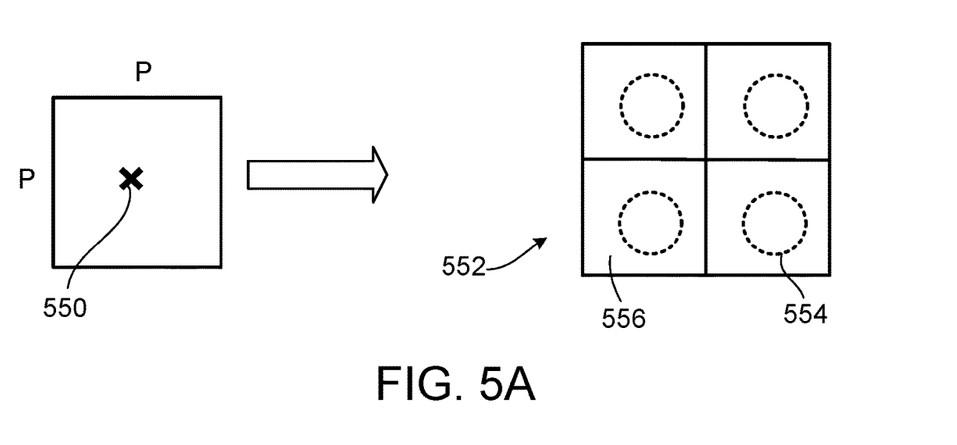
FIGS. 5A-5B are schematics showing examples of far-field light patterns generated by combinations of light-emitting elements.

FIG. 5A shows an example of a far-field pattern illumination 552 resulting from a single light-emitting element 550 in a module that does not satisfy the Lau condition, e.g., a single light-emitting element including a layer of high refractive index material such that $P^2 \neq 2LD/N$ for the light-emitting element. Because of this deviation from the Lau condition, the resulting far-field illumination pattern 552 includes one spot 554 in each unit cell 556 of the far-field pattern illumination 552, each spot 554 having a lower per-area intensity than, and being larger than, corresponding dots in the periodic dot pattern 442 of FIG. 4A. The addition of further light-emitting elements in an array having pitch P (matching the pitch P of the optical element array illuminated by the light-emitting element 550 of FIG. 5A, e.g., as shown in FIGS. 4B-4C) would merely intensify the far-field illumination pattern 552; areas between the spots 554 would not be illuminated, and the illumination would not be sufficiently diffuse.

Moreover, because manufacturing constraints and other constrains may impose a minimum distance between neighboring light-emitting elements, in some implementations it may not be possible to "fill in" the illumination pattern by causing the second subset of light-emitting elements to, for example, cover uniformly an entire portion of a substrate on which the light-emitting elements are disposed, or to put the second subset of light-emitting elements in close enough proximity to one another to fill in the non-illuminated portions of the far-field illumination pattern 552.

Figure 5B:
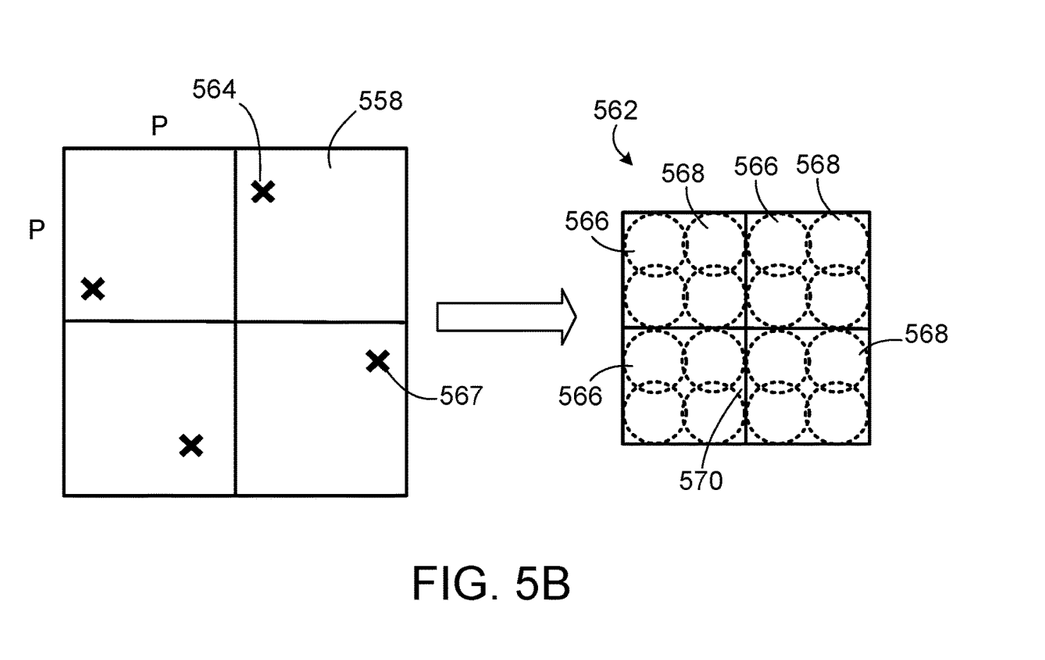

Therefore, in some implementations, in order to produce diffuse illumination, the light-emitting elements of the second subset may be relatively positioned across multiple illuminator unit cells 558, each illuminator unit cell 558 having dimensions P matching the pitch of the optical element array. With this arrangement, as shown in FIG. 5B, each light-emitting element of the second subset 560 produces multiple far-field spots, such that the combination of the far-field spots produces a diffuse far-field pattern 562, while minimum-spacing constraints for the light-emitting elements 550 are satisfied. For example, in some implementations, each illuminator unit cell 558 includes one light-emitting element. In some implementations, each illuminator unit cell 558 includes two or fewer light-emitting elements.

For example, as shown in FIG. 5B, a first light-emitting element 564, positioned in the top-left quadrant of its unit cell, results in multiple corresponding top-left spots 566 in the far-field illumination pattern 562. A second light-emitting element 567, positioned in the top-right of its unit cell, results in multiple corresponding top-right spots 568 in the far-field illumination pattern 562. Far-field spots caused by different light-emitting elements merge with one another in the far-field illumination pattern 562. The light-emitting elements are positioned at different positions in their respective unit cells so as to produce a diffuse far-field pattern when the spots caused by each light-emitting element are combined.

For ease of comprehension, the example of FIG. 5B shows a far-field illumination pattern 562 that includes illumination gaps (e.g., gap 570). In some implementations, the array of light-emitting element is configured (e.g., by the inclusion of additional light-emitting elements) such that the far-field illumination pattern does not include illumination gaps.

In some implementations, the positioning described in reference to FIG. 5B may be employed for a second subset of light-emitting elements emitting light that does not satisfy the Lau equation; the second subset of light-emitting elements need not (but may) transmit the light through a layer of high refractive index material.

Figure 6:
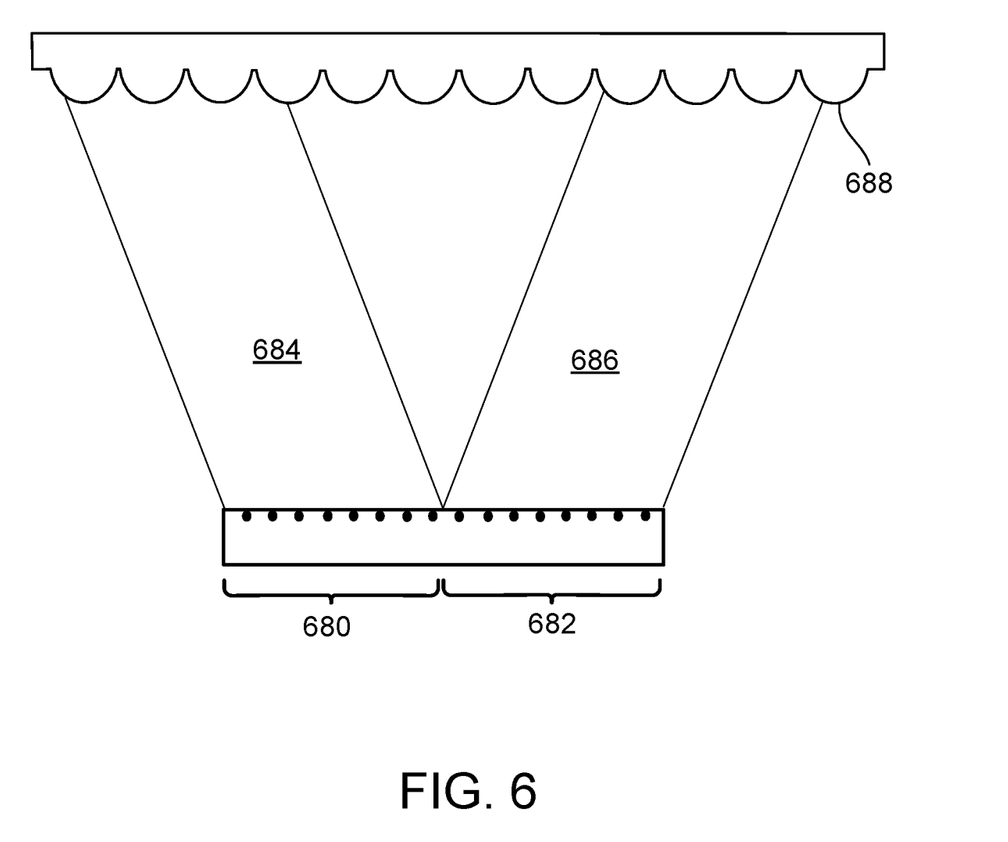
FIG. 6 is a schematic showing an example of an optical module including two subsets of light-emitting elements.

In some implementations, both subsets of light-emitting elements may illuminate a single optical element array. In the example shown in FIG. 6, a first subset of light-emitting elements 680 (with corresponding light emission cone 684) and a second subset of light-emitting elements 682 (with corresponding light emission cone 686) both illuminate an optical element array 688. In some implementations, the use of shared optics, including, for example, a shared array of optical elements, may result in a decrease in device size, compared to devices in which separate sets of light-emitting elements illuminate separate optical element arrays.

In various implementations, a shared optical element array may be illuminated by interlaced subsets of light-emitting elements or by spatially-separate subsets of light-emitting elements.

In some instances, temporal light stitching is employed to fill gaps in the diffuse illumination. In this case, the first subset of light-emitting elements 203 can be, e.g., VCSELs having a relatively small aperture, each of which results in a relatively sharp, bright spot when the VCSEL is turned on. On the other hand, the second subset of light-emitting elements 205 can be, e.g., VCSELs that provide relatively diffuse illumination because of the presence of the high refractive index material 209. The light-emitting elements 203 of the first subset are turned on for a shorter duration than the light-emitting elements 205 having the larger aperture. The period during which the two subsets of light-emitting elements 203, 205 are on overlaps, but only partially. The duration for which the light-emitting elements 203 are turned on can be chosen such that the total optical power per area projected onto the scene by the light-emitting elements 203 is substantially the same as the total optical power per area projected onto the scene by light-emitting elements 205.

Figure 7A:
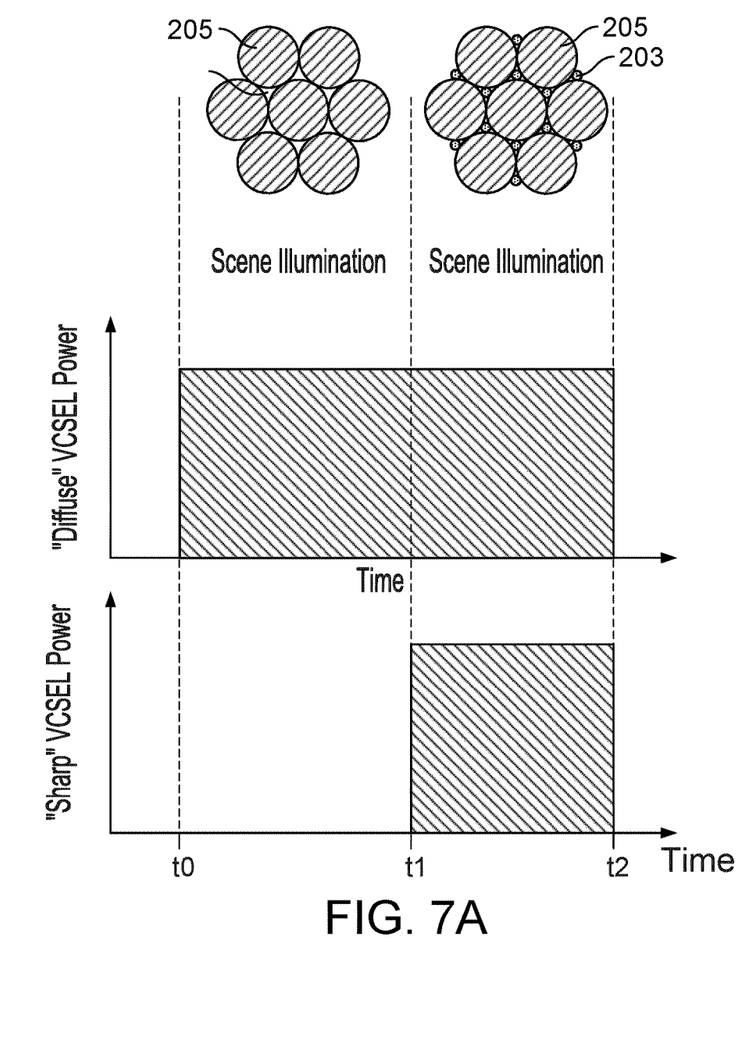
FIG. 7A is a graph illustrating an example of temporal light stitching.
Figure 7B:
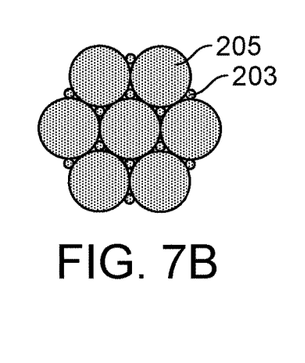
FIG. 7B illustrates an example of the resulting illumination for the scenario of FIG. 7A.

An example of this scenario is illustrated in FIG. 7A, where the shaded areas in the graphs plotting power versus time indicate periods when the respective light-emitting elements are on (i.e., emitting light). Thus, from time t0 until time t1, only the diffuse illumination light-emitting elements 205 are on. Then, from time t1 until time t2, the light-emitting elements 203, which emit greater optical power per unit area per time, also are on. FIG. 7B illustrates the total optical power projected onto areas of an image plane, which indicates that a more homogenous illumination can be achieved and such that the illuminated region has fewer and/or smaller gaps. Control circuitry can be coupled to the light-emitting elements 203, 205 and can be operable to control respective durations for which the light emitting elements of the first and second subsets are on so that a resulting overall illumination projected onto the scene is substantially homogenous diffuse illumination.

Figure 8A:
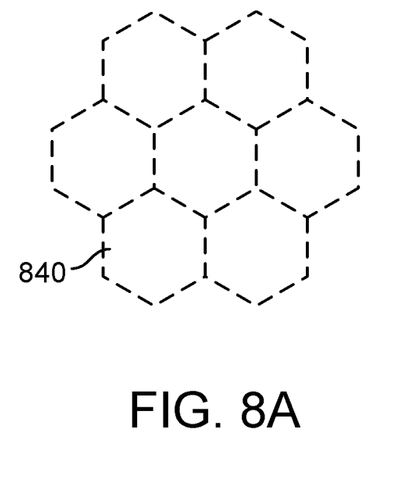
FIG. 8A illustrates an example of gap-free homogenous diffuse illumination on a scene using light emitting elements having a hexagonal aperture.
Figure 8B:
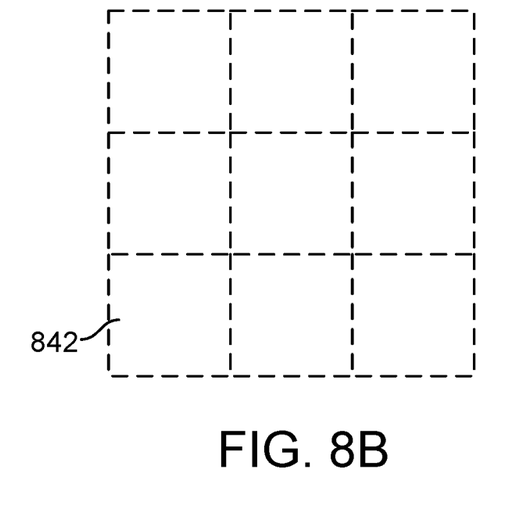
FIG. 8B illustrates an example of the gap-free homogenous diffuse illumination on a scene using light emitting elements having a square aperture.

In some implementations, instead of circular apertures, each light-emitting element (e.g., VCSEL) in at least one of the subsets has a rectangular (e.g., square) or hexagonal shape. This approach allows each respective light beam projected onto the scene to have a particular beam-waist such that a smooth stitching (gap-free illumination) can be designed for a fixed working distance (or working distance range). Further, at a particular working distance, there is little or no overlap in the individual light beams projected onto the scene. Thus, the resulting diffuse illumination can be highly uniform or homogenous. FIG. 8A illustrates an example of the resulting gap-free homogenous diffuse illumination on a scene when each VCSEL in a particular subset has a hexagonal aperture. In this cases, each VCSEL in the subset projects a light beam 840 onto the scene having a substantially hexagonal shape. FIG. 8B illustrates an example of the resulting gap-free homogenous diffuse illumination on a scene when each VCSEL in the subset has a square aperture. In this cases, each VCSEL in the subset projects a light beam 842 onto the scene having a substantially square shape.

In some implementations, the foregoing approach can be integrated into a multi-mode device. For example, in a first mode, a first subset of light-emitting elements 205 having a rectangular or hexagonal shaped aperture can be turned on to project a substantially gap-free diffuse illumination onto a scene, whereas in a second mode, a second subset of light-emitting elements 203, each of which has a relatively small circular aperture, can be turned on (while the first subset of light-emitting elements is off) to project a structured light pattern onto a scene.

In some cases, features of the foregoing approaches may be combined. Such an implementation can be advantageous, for example, when the object(s) in a scene to be illuminated are outside the ideal operational working range for which the hexagonal or rectangular subset is optimized. For example, if the object(s) is outside the ideal working range (e.g., at a large distance z1), then there may be gaps between the individual illuminated regions on the scene that are illuminated by the light-emitting elements having square aperture. In that case, it can be advantageous to have a second subset of light-emitting elements (e.g., VCSELs having a relatively small circular aperture), which can be turned on for a shorter duration than the VCSELs having a rectangular or hexagonal shaped aperture to obtain a more homogenous illumination. The "sharp" light-emitting elements are configured to patch areas of the diffuse illumination by providing illumination in the gaps.

Figure 9:
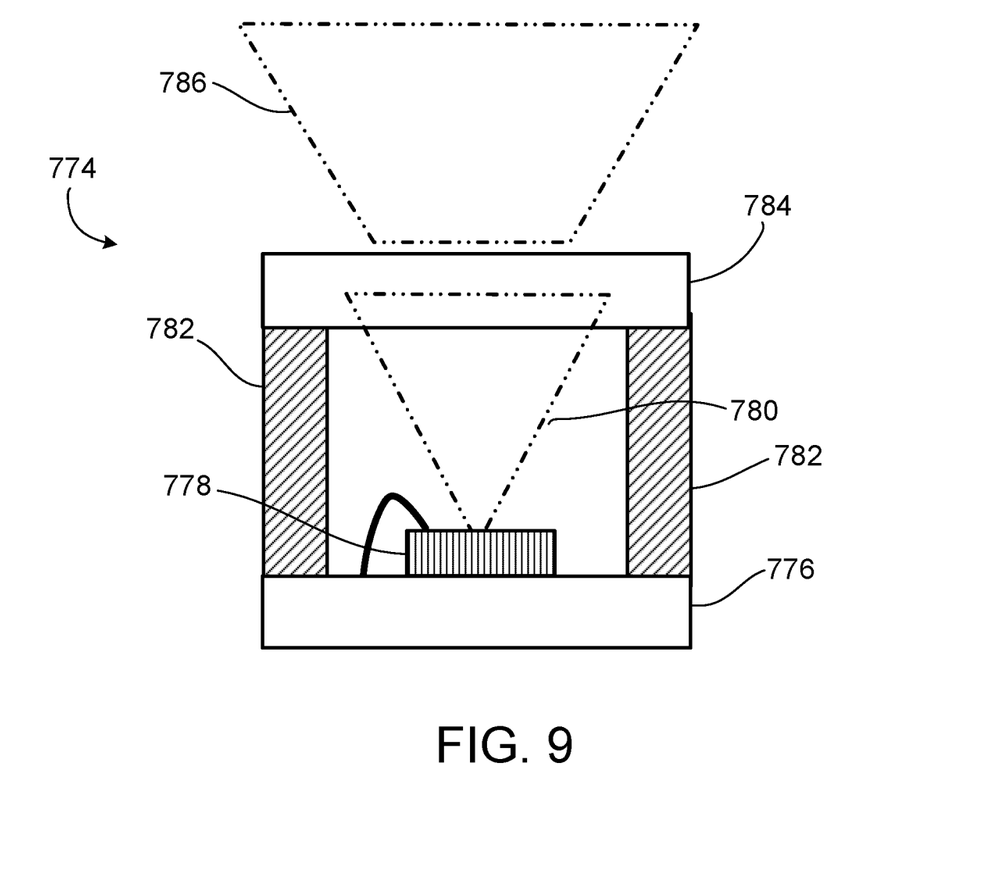
FIG. 9 is a schematic showing an example of an optical system.

In some implementations, devices incorporating two subsets of light-emitting elements, a first subset configured to generate structured light and a second subset configured to generate diffuse light, as described above, may be integrated, for example, into optical or optoelectronic systems. As shown in FIG. 7, a system 774 (not shown to scale) includes a base 776 (for example, a circuit board or a semiconductor or dielectric substrate) and an array of light-emitting elements 778 coupled to, or integrated into, the base 876.

Light 780 generated by the array of light-emitting elements 778 is transmitted through a housing and then through an array of optical elements 784. A first subset of the array of light-emitting elements is configured such that the Lau condition is satisfied for light emitted by that subset and passing through the array of optical elements 784. A second subset of the array of light-emitting elements is configured (e.g., by a layer of a high refractive materials) such that light emitted by that subset does not satisfy the Lau condition.

Light 786, which may include one or both of structured light and diffuse light, is transmitted out of the system 774. The housing may include, for example, spacers 782 separating the light-emitting elements 778 and/or the base 776 from the array of optical elements 884.

In some implementations, the system 774 may include both light-emitting and light-sensing components. For example, the system 774 may emit structured light that interacts with an environment of the system 774 and is then received back by the system 774 (e.g., by light-sensing components of the system 774), allowing the system 774 to act, for example, as a proximity sensor or as a three-dimensional mapping device.

The systems described above may be part of, for example, time-of-flight cameras and active-stereo cameras. The systems may be integrated into systems, for example, mobile phones, laptops, wearable devices, and automotive vehicles.

In some implementations, a system may include circuitry configured to control the light-emitting elements. In some implementations, the circuitry may be integrated into a substrate in which the light-emitting elements are also integrated; in some implementations, the circuitry may be integrated into a separate substrate that is electrically coupled (e.g., bonded) to the substrate in which the light-emitting elements are integrated.

The circuitry (which may include, for example, computer circuitry) may be configured to control the light-emitting elements in order to cause, for example, either or both of the subsets of light-emitting elements to emit light, depending on the present operational needs of the system.

Therefore, in accordance with the implementations of this disclosure, device structures are described for generating both structured light and diffuse light from an optical module.

Various aspects of the subject matter and the functional operations described in this specification can be implemented in digital electronic circuitry, or in computer software, firmware, or hardware, including the structures disclosed in this specification and their structural equivalents, or in combinations of one or more of them. For example, the circuitry that controls the light-emitting elements may include a microprocessor or other digital computing element. Thus, aspects of the subject matter described in this specification can be implemented as one or more computer program products, i.e., one or more modules of computer program instructions encoded on a computer readable medium for execution by, or to control the operation of, the control circuitry. The computer readable medium can be a machine-readable storage device, a machine-readable storage substrate, a memory device, a non-transitory computer-readable medium, a composition of matter effecting a machine-readable propagated signal, or a combination of one or more of them. The system can include, in addition to hardware, code that creates an execution environment for the computer program in question, e.g., code that constitutes processor firmware.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should be noted that various aspects of the foregoing implementations may be provided in combination or individually. Elements of different embodiments described herein may be combined to form other embodiments not specifically set forth above.

Accordingly, other implementations are also within the scope of the claims.

What is claimed is:

1. An optical device, comprising:
   an array of light-emitting elements, comprising a first subset of light-emitting elements and a second subset of light-emitting elements,
      wherein the first subset of light-emitting elements is configured to emit light having wavelength $L_1$;
   a high refractive index material selectively disposed on the second subset of light-emitting elements but not on the first subset of light-emitting elements; and
   an array of optical elements positioned so as to be illuminated by the first subset of light-emitting elements and by the second subset of light-emitting elements,
      wherein the optical elements are regularly arranged in a common plane at a pitch P, wherein the common plane is located a distance D from the array of light-emitting elements, and
      wherein $P^2 \approx 2L_1 D/N$, N being an integer greater than or equal to 1.

2. The optical device of claim 1, wherein the second subset of light-emitting elements is configured to emit light having wavelength $L_2$, wherein the high refractive index material is configured to impose an effective optical distance $D_2$ between the second subset of light-emitting elements and the common plane, and
   wherein $P^2 \neq 2L_2 D_2/N$, N being an integer greater than or equal to 1.

3. The optical device of claim 2, wherein $L_1 \neq L_2$.

4. The optical device of claim 1, wherein $P^2 \approx 2L_1 D/N$ to within about 50 µm of effective D.

5. The optical device of claim 1, wherein the first subset of light-emitting elements and the second subset of light-emitting elements are arranged in a common emitter plane.

6. The optical device of claim 1, wherein the first subset of light-emitting elements and the second subset of light-emitting elements are arranged in respective non-overlapping areas.

7. The optical device of claim 1, wherein the first subset of light-emitting elements and the second subset of light-emitting elements are interlaced with one another.

8. The optical device of claim 1, wherein the first subset of light-emitting elements is arranged in a first pattern, and wherein the second subset of light-emitting elements is arranged in a second pattern different from the first pattern.

9. The optical device of claim 1, wherein the array of optical elements causes light emitted by each light-emitting element to be transformed into a far field light pattern of regularly spaced light spots, and
   wherein the regularly spaced light spots generated by different light-emitting elements of the second subset of light-emitting elements overlap with one another.

10. The optical device of claim 9, wherein, at a given far-field distance from the array of optical elements, each light spot generated by a light-emitting element of the second subset of light-emitting elements is bigger than each light spot generated by a light-emitting element of the first subset of light-emitting elements.

11. The optical device of claim 1, wherein the array of optical elements comprises lenses.

12. The optical device of claim 1, wherein the array of light-emitting elements comprises vertical cavity surface emitting lasers.

13. The optical device of claim 1, wherein the high refractive index material comprises a curable epoxy.

14. The optical device of claim 1, wherein the high refractive index material has a refractive index greater than about 1.

15. The optical device of claim 14, wherein the high refractive index material has a refractive index between about 1.1 and about 2.0.

16. The optical device of claim 15, wherein the high refractive index material has a refractive index between about 1.4 and about 1.9.

17. The optical device of claim 1, wherein the high refractive index material has a thickness between about 10 µm and about 300 µm.

18. The optical device of claim 1, wherein light generated by the first subset of light-emitting elements and passing through the array of optical elements has a regular far field pattern, and
   wherein light generated by the second subset of light-emitting elements and passing through the array of optical elements is diffuse in the far field.

19. The optical device of claim 1, wherein the second subset of light-emitting elements are relatively positioned, with respect to a grid having unit cell spacing P, such that at least a portion of the second subset of light-emitting elements are at different positions with respect to the unit cells in which the light-emitting elements are located.

20. A system comprising:
   an optical device in accordance with claim 1, and
   control circuitry configured to cause the first subset of light-emitting elements or the second subset of light-emitting elements to emit light independently of one another.

21. The system of claim 20, comprising a light-sensing element configured to detect structured light emitted by the optical device.

* * * * *